United States Patent [19]
Pinault et al.

[11] Patent Number: 5,604,740
[45] Date of Patent: Feb. 18, 1997

[54] MULTI-PATH BUS DIGITAL SIGNAL PROCESSOR

[75] Inventors: Michael Pinault, Hudson, N.H.; Malcom Strandberg, Cambridge, Mass.

[73] Assignee: Davox Corporation, Westford, Mass.

[21] Appl. No.: 336,264

[22] Filed: Nov. 8, 1994

Related U.S. Application Data

[63] Continuation-in-part of Ser. No. 252,336, Jun. 1, 1994.
[51] Int. Cl.$^6$ ........................................... H04J 3/02
[52] U.S. Cl. .......................... 370/463; 379/89; 379/284
[58] Field of Search .................... 370/13, 14, 15, 370/85.2, 85.3, 85.4, 85.5, 85.9, 85.12, 85.13, 110.1, 110.2, 110.3; 379/1, 5, 88, 89, 284

[56] References Cited

U.S. PATENT DOCUMENTS

| | | | |
|---|---|---|---|
| 4,640,992 | 2/1987 | Rose | 370/61 |
| 4,718,057 | 1/1988 | Venkitakrishnan et al. | 370/85.1 |
| 4,975,904 | 12/1990 | Mann et al. | 370/85.1 |
| 5,046,072 | 9/1991 | Shimizu et al. | 370/85.1 |
| 5,163,050 | 11/1992 | Cromack | 370/110.3 |
| 5,195,085 | 3/1993 | Bertsch et al. | 370/13 |
| 5,299,198 | 3/1994 | Kay et al. | 370/95.3 |
| 5,341,368 | 8/1994 | Henning et al. | 370/85.13 |

*Primary Examiner*—Douglas W. Olms
*Assistant Examiner*—Russell W. Blum
*Attorney, Agent, or Firm*—Daniel J. Bourque; Kevin J. Carroll

[57] ABSTRACT

A multi-path digital signal processor for use in a telephony system provides a first data path for interfacing to a local area network, a second data path for interfacing to an industry standard computer backplane bus, and at least one third data path for interfacing to at least one time division multiplexed digital signal path. The Digital Signal Processor may transmit and receive data by any or all of these means to allow efficient data transfer and processing by the Digital Signal Processor in a telephony system.

24 Claims, 2 Drawing Sheets

MULTI-PATH BUS DIGITAL SIGNAL PROCESSOR

FIELD OF THE INVENTION

This invention relates to a digital signal processor system, and more particularly, to a digital signal processing system which provides three separate paths for sending and receiving data both inside and outside the processing system.

RELATED APPLICATION

This application is a continuation-in-part of patent application No. 08/252,336 filed on Jun. 1, 1994, pending.

This application is related to U.S. patent application Ser. No.: 08/252,121 filed Jun. 1, 1994, now abandoned, assigned to the assignee of the present invention and fully incorporated herein by reference.

BACKGROUND OF THE INVENTION

Many businesses and customer service organizations utilize telephony distribution systems to route and process incoming and outgoing calls. Such telephony systems often include digital communication servers, which may include digital signal processing systems. Such systems use digital signal processing for analyzing telephonic signals such as busy tones, voice, answer machines and various tones generated by telephone equipment. Also, digital signal processing can be used to generate signals such as digital voice, or tones for dialing telephones, connect calls to and from trunk lines, and interface with a host computer or database, to illustrate a few examples.

Digital signal processors (DSP's) must process massive amounts of data in real time. Therefore, the DSP must be well integrated within a processing system and have very fast data paths to move data to and from of the DSP. A standard way of sending signals to be processed to the DSP is through pulse code modulation (PCM). PCM is a digitized signal which represents the analog signal to be analyzed. It can often be multiplexed with other signals in a method known as time division multiplex (TDM) whereby several PCM signals are multiplexed together to use one data path. TDM allows a single DSP to handle multiple digital signals to be processed, thereby making efficient use of system resources.

The DSP must be able to input and output digital signals, however, it also is a powerful computer in its own right and must be able to transfer program data from other systems to itself, and output data to other systems. This is often done over a bus such as a Versa-bus Modular Eurocard (VME). This is a standardized backplane bus which allows data to be transferred within a digital communication server system. Examples of data to be transferred will be executable code for the DSP to execute, or digital voice files for the DSP to synthesize and send out as PCM signal.

Still another way to send data to and from a DSP is through the use of a local area network. This can be in the form of ethernet or token ring. Local area networks are often used for sending commands and programs to individual systems, as well as doing diagnostics and analyzing data dumps.

So to be properly integrated within a system, a DSP must be able to accept many different types of data, such as digital signal, serial data, program data, and commands. Also, the DSP must be able to communicate with many other subsystems within the digital communication server, some of which may not share the same communication paths with the DSP.

Even though a DSP may be able to handle several digital channel signals at once, the needs of a system will often require more than one DSP to be present to handle the signal processing load. Each separate DSP must be able to communicate with all other subsystems within the digital communication server, to work properly. However, as system requirements change or grow, the number of DSPs required may also change. Therefore, a system where modular DSPs may be easily added or removed as needed can provide a much more versatile system.

DSPs have been integrated into telephony systems using at most only two communication paths. DSPs have typically used a PCM path to send and receive digitized signals and a backplane bus for everything else. If the telephony systems did include some form of local area network, the local area network was interfaced to another part of the system, with data then shuttled to the DSP on the VME bus. This required other parts of the system to provide processing assistance to the DSP and prohibited easy expansion or resizing of the number of DSPs in the system. Also, having few data paths prevented the DSP from having backup communication paths should one particular path not be available. This may occur in an overloaded system, or one with a partial system failure. This may also occur if a particular model of DSP is installed in a system that provided different communication paths than the standard VME and PCM paths.

Accordingly, what is needed is a DSP that can communicate on three separate paths to other parts of the system, thereby allowing for efficient data transfer within and without the system, and allow for easy modular expansion of the system for adding or removing DSP units as necessary to meet system requirements.

SUMMARY OF THE INVENTION

In accordance with the present invention a digital signal processor which includes three separate communication paths for providing digital signal processing within a digital communication server or other electronic system such as a telephony system is provided. The DSP card includes a local area network controller which allows it to communicate over ethernet or another local area network system, a standard processor backplane bus controller, such as VME, which allows it to communicate over a standard processor backplane bus and at least one PCM communication path, which allows the processor to communicate over one of many possible PCM communication paths to send and receive digitized signals to other parts of the digital communication server system. All of these paths are available for communication, often simultaneously, depending upon the type of data being transferred, and availability of paths. The DSP is completely self-contained, so adding new DSPs to the system is very simple.

In a typical arrangement, the digital signal processor will receive system commands and executable code via the local area network, and may also send program dumps and diagnostic data out over the same path. The processor backplane bus can be used to perform direct memory accesses (DMA) to and from subsystems including storage systems and other data processing systems within the digital communication server system. Finally, synchronous data such as digitized speech or telephone signals can be sent or received by one of the PCM paths. The various paths can be used for other data transfer depending upon availability of other paths within the system. For example, should a DSP be installed in a telephony system that does not support a local area network then the local area network will not be used by the DSP to communicate with that system. However, the local area network may still be used between DSPs to communicate with each other.

Since the DSP is completely self-contained with all the circuitry necessary to communicate by the separate paths, modular growth of a system is possible by adding extra DSP boards as necessary to handle the digital signal processing required by the system.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
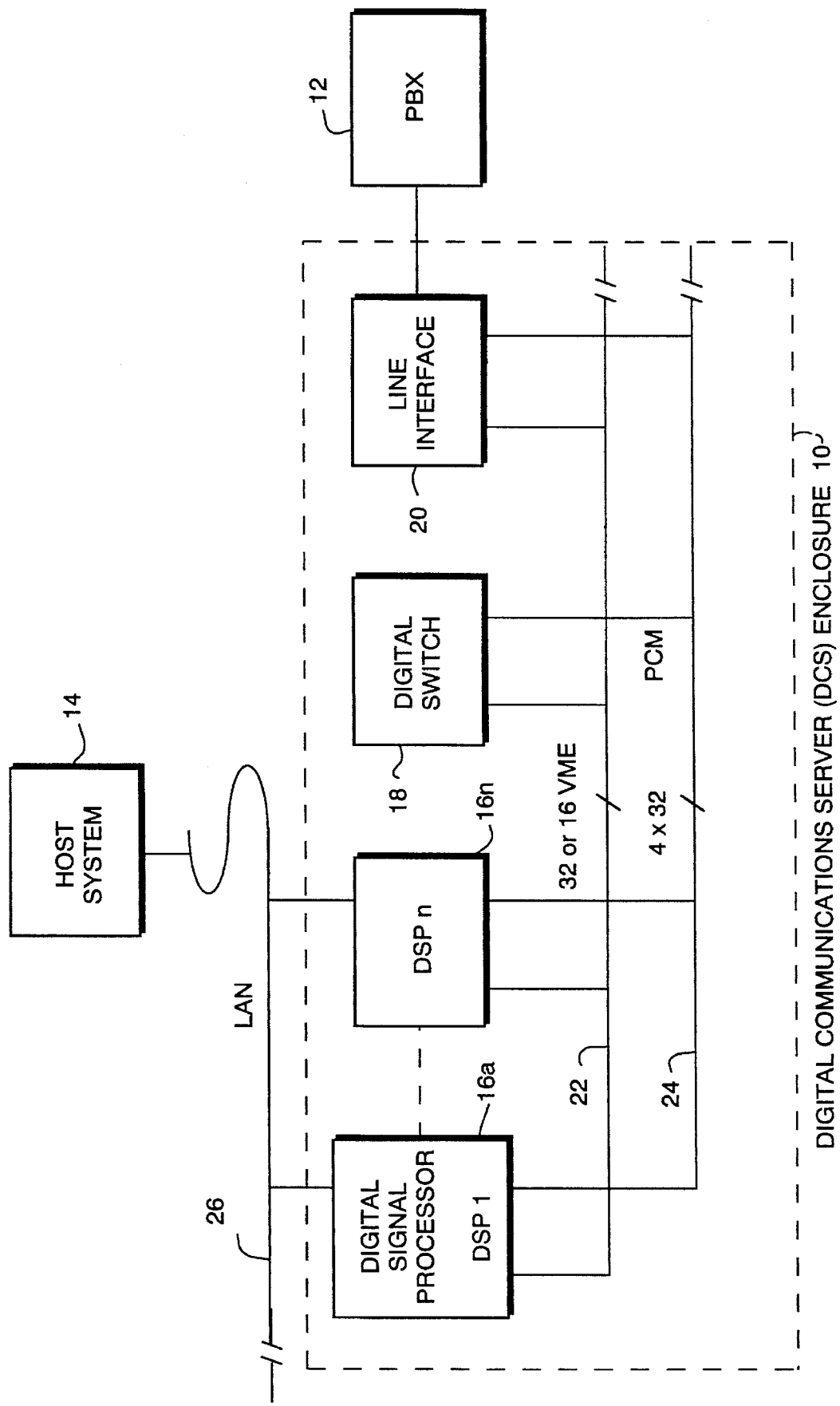
FIG. 1 is a diagrammatical representation of a digital communication server which contains DSPs which are connected to a local area network, a standard processor backplane bus, and multiple PCM signal paths according to the present invention.

For exemplary purposes, a telephony system including a digital communication server 10, FIG. 1, which contains digital signal processors with multiple data paths may be provided for example, as the Davox Unison™ System manufactured by Davox Corporation, Westford, Mass. and described in greater detail in U.S. patent application Ser. No. 08/252,121 incorporated herein by reference. The digital communication server (DCS) 10 interfaces with other systems including, for example, a private branch exchange 12 for connecting to trunk lines to send and receive telephone calls. The digital communication server 10 may also interface to a host system 14, which controls the DCS and provides software and management of the system.

In the preferred embodiment, host system 14 is a Sun Microsystems brand "SPARC" computer. Inside DCS enclosure 10 there are many digital signal processors 16a–16n along with digital switch 18 and line interface 20. A standard Versa-bus Modular Eurocard (VME) communication bus 22 or any standard processor bus, such as EISA (Extended Industry Standard Architecture) or PCI (Peripheral Communication Interface), connects all the systems and sub-systems within the DCS. In the preferred embodiment, the bus is a 32 bit VME standard backplane bus. 16 bit VME bus boards may also be provided. The VME backplane bus provides a standard communication path for DSC 10 and may also interface to storage devices such as tape drives, floppy disks, or hard disk drives (not shown) and provide direct memory access to various other system resources.

PCM data path 24 is also available for transmitting digitized telephony or voice signals within the system. In the preferred embodiment, the PCM data path comprises four separate thirty-two path connections which provide individual data paths for differential driven signals to the system elements that require it. For example, a telephone call will come in through private branch exchange 12 and by sent into line interface 20 which will connect to one of the PCM data paths on the PCM multi-path bus 24. Digital switch 18 will then route the signal to another possible path on the PCM multi-path bus to be sent on to a specific digital signal processor 16a. Digital signal processor (DSP) 16a will then process the telephony signals and perform any other system requirements as needed with the signal. Each DSP may receive one signal from each of the four separate groups of thirty-two paths at one time. So each DSP can receive four signals simultaneously on each of the four separate thirty-two path connections. Digital switch 18 is responsible for routing the signals to appropriate paths to allow each DSP card (16a–16n) to receive the signals that it is responsible for processing. In the preferred embodiment, the digital signal is 8-bit pulse code modulation. The digital signal may also be Mulaw or Alaw decoded, and filtered with digital signal processing algorithms as is well known in the art.

Host system 14 can communicate to each DSP card over a local area network 26. This local area network may comprise twisted pair ethernet, thin wire ethernet, token ring, or token bus ethernet.

Figure 2:
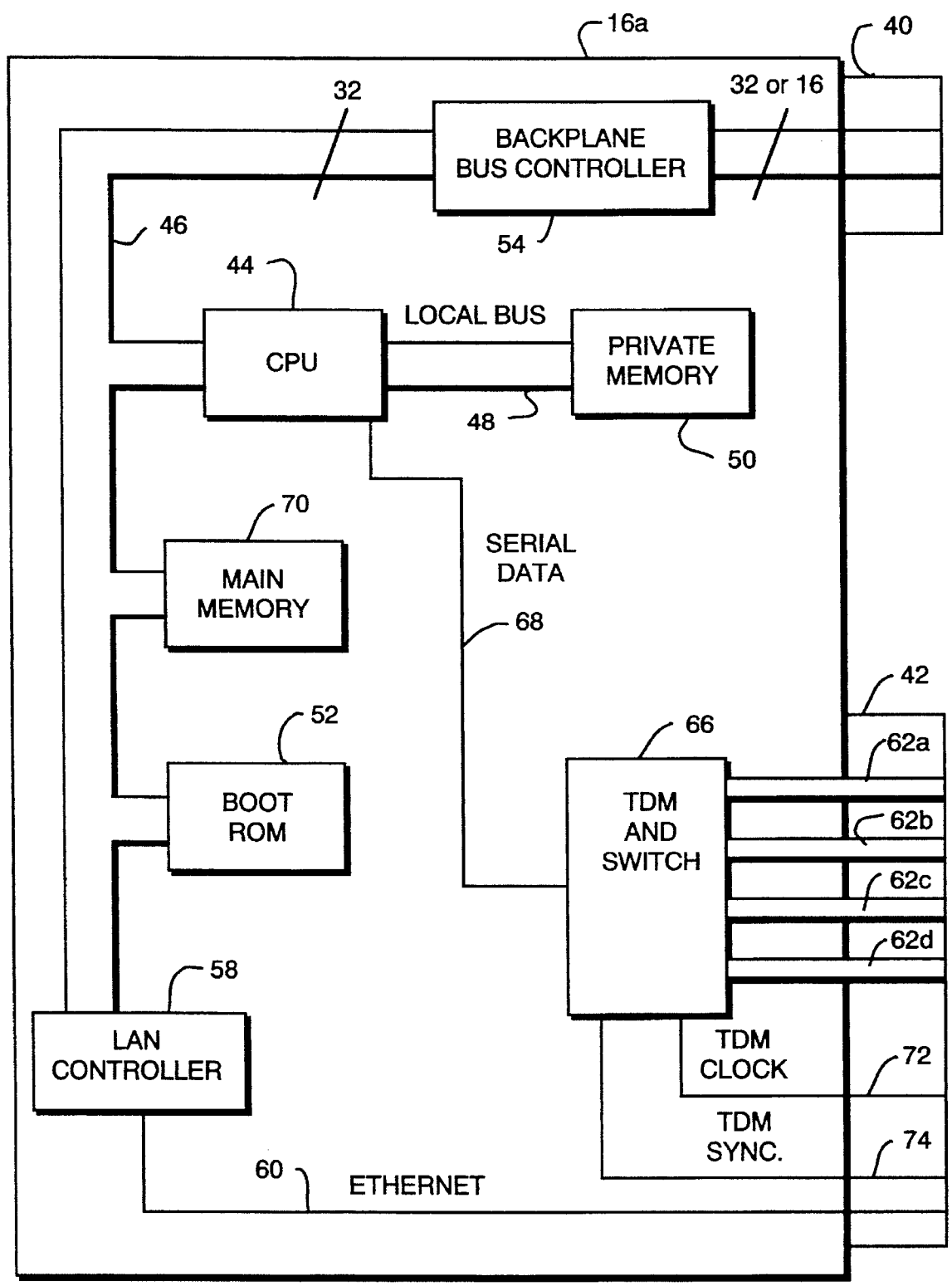
FIG. 2 is a diagrammatical representation of a Digital Signal Processor showing the major components that allow the DSP to communicate by means of the separate data paths in accordance with the present invention.

Turning now to FIG. 2 an individual digital signal processing printed circuit board is presented. DSP card 16a has edge connector 40 for VME bus and connector 42 for the PCM multi-paths. Internally on the DSP card is a CPU 44. CPU 44 provides control for the DSP card and also performs the digital signal processing. CPU 44 shown here is a Harvard architecture DSP, which supports two processor and memory buses. CPU 44 is connected to main bus 46 and main memory 70, which is a 32 bit internal bus for communication on the DSP card. Local bus 48 is also provided which connects CPU 44 to private memory 50. Local bus 48 provides fast access to private RAM 50 allowing CPU 44 to avoid the slower main bus 46 for most memory accesses. Main bus 46 connects to boot ROM 52 which provides start up software for CPU 44 when the system is activated. Also connected to main bus 46 is local area network controller 58. Local area network controller 58 provides packeting and collision detection, as well as address management for the DSP. Local area network communication is over line 60 through connector 42 to a companion paddle card as described in co-pending Application, Ser. No. 08/252,335, incorporated herein by reference The companion paddle card may provide some extra circuitry for controlling the local area network, which then connects by a standard ethernet connector onto ethernet 26, FIG. 1. Alternatively, local area network controller 58 may provide token ring management for connecting the system to a token ring.

Main bus 46 also connects to a VME controller 54. VME controller 54 connects to VME path 56 which leaves DSP card 16a through connector 40. This connects to VME 22, FIG. 1 bus on the digital communication system server backplane. VME controller 54 provides for complete bus management as well as converting VME bus to 32-bit main bus 46 protocol. Alternatively, any standard backplane bus controller may be used.

PCM multi-paths 62a–62d attach to the DSP card 16a through connector 42. Each path, for example path 62a, comprises two lines, which each support up to thirty-two TDM signals. Path 62a enters time division multiplexer 66, which allows the selection of one or more signals from the thirty-two data signals available. CPU 44 selects which line it will send and receive pulse code modulated serial data signals over. TDM 66 receives clock signals over path 72 and sync signals over path 74 from the system. These signals allow TDM 66 to multiplex the data. The signals proceed from time division multiplexer 66 to CPU 44 over path 68. CPU 44 is capable of analyzing or synthesizing four to 32 multiplexed signals at one time. In the preferred embodiment, the differential driven PCM paths transmit and receive data at speeds up to 2,048 megabytes per second.

In the preferred embodiment DSP card 16a will use various paths to send and receive various types of data. The local area network which connects to a host system will be used to receive commands from the host system, executable code to be executed by the DSP's CPU, and may also send out program dumps to be analyzed by the host system as well as interactive diagnostics.

The VME bus will be used to perform direct memory accesses to other parts of the system, such as loading data into local memory from a storage device located elsewhere in the digital communication server. Also, control signals such as data line selection for PCM and processing instructions may be sent and received over the VME bus. PCM multi-paths are mostly used for synchronous data such as digitized speech and telephony information, which is usually in the form of 8-bit pulse code modulated digital signals.

For example, turning back to FIG. 1, if DSP card 16n is to play a digitized message over a phone line connected to the system, the commands to transmit the digital voice will be received over local area network line 26 from host system 14. The digitized voice file will be received over VME bus 22 which will allow the digitized voice file to be loaded into RAM on DSP 16n. DSP 16n will then synthesize the digital voice to be sent out over a selected line in PCM multi-path 24, which is connected through digital switch 18 to telephone line interface system 20 which connects it to the trunk line out to private branch exchange 12. This allows DSP 16n to play the voice message out over the telephone line to the listener at the other end.

Although each path lends itself to sending and receiving certain types of data and signals, different paths may be used to transfer data. For example, in a system that does not have a local area network, the commands and executable code can be sent to a DSP over the VME bus. As another example, pulse code modulated digital signals may also be sent over the VME bus in the form of converting the signal serial data into 16 or 32 bit data to be received in parallel over the VME bus and then analyzed by the DSP.

Modifications and substitutions by one of ordinary skill in the art are considered to be within the scope of the present invention which is not to be limited except by the claims which follow.

What is claimed is:

1. A multi-path digital signal processor for use in a telephony system, said multi-path digital signal processor comprising:
    a first means for directly interfacing to a local area network;
    a second means for interfacing to a standard computer backplane bus; and
    a third means for interfacing to at least one synchronous serial signal path supporting time division multiplexing;
    wherein said digital signal processor can transmit and receive data to and from said telephony system by any one of said first, second and third means for interfacing.

2. The multi-path digital signal processor as claimed in claim 1, wherein said first means for interfacing to a local area network includes a means for receiving commands from said local area network.

3. The multi-path digital process of claim 1, wherein said first means for interfacing to a local area network includes means for receiving executable code from said local area network for execution by said digital signal processor.

4. The multi-path digital signal processor of claim 1, wherein said first means for interfacing to a local area network is operative to send program dumps out over said local area network to be analyzed by said telephony system.

5. The multi-path digital signal processor of claim 1, wherein said first means for interfacing to a local area network is operative to perform diagnostics over said means for interfacing to a local area network, with said telephony system.

6. The multi-path digital signal processor of claim 1, wherein said second means for interfacing to a standard computer backplane bus includes a means for performing direct memory access transfers from said telephony system.

7. The multi-path digital signal processor of claim 1, wherein said second means for interfacing to a standard computer backplane bus includes a means for transferring data to other digital signal processors.

8. The multi-path digital signal processor of claim 1, wherein said third means for interfacing to at least one synchronous serial signal path includes means for sending and receiving synchronous data for processing by said digital signal processor.

9. The multi-path digital signal processor of claim 8, wherein said synchronous data is Linear Predictive Coded speech.

10. The multi-path digital signal processor of claim 1, wherein said means for interfacing to at least one synchronous serial signal path includes a means of sending and receiving time division multiplexed data.

11. The multi-path digital signal processor of claim 1, wherein said means for interfacing to at least one synchronous serial signal path includes a means for sending and receiving digitized speech.

12. The multi-path digital signal processor of claim 1, wherein said means for interfacing to at least one synchronous serial signal path includes a means for sending and receiving telephony signals.

13. The multi-path digital signal processor of claim 1, wherein said at least one synchronous serial signal path is differentially driven.

14. The multi-path digital signal processor of claim 1, wherein said local area network includes ethernet.

15. The multi-path digital signal processor of claim 14, wherein said ethernet includes a thin wire ethernet connector.

16. The multi-path digital signal processor of claim 1, wherein said local area network includes token ring.

17. The multi-path digital signal processor of claim 1, wherein said second means for interfacing to a standard computer backplane bus includes interface to a standard Versa-bus Modular Eurocard (VME) bus connector.

18. The multi-path digital signal processor of claim 1, wherein said third means for interfacing to at least one synchronous serial signal path includes a 4 by 16 multiplexed data path.

19. The multi-path digital signal processor of claim 1, wherein said third means for interfacing to at least one synchronous serial signal path includes a 4 by 16 multiplexed data path.

20. The multi-path digital signal processor of claim 1, wherein said telephony system includes a plurality of said multi-path digital signal processors.

21. A multi-path digital signal processor for use in a telephony system, said multi-path digital signal processor comprising:

an ethernet data path connection, for directly connecting to an ethernet data path;

a Versa-bus Modular Eurocard (VME) bus data path connection; and at least one synchronous serial data path connection;

wherein said multi-path digital signal processor can transmit and receive data by any one of said connections, based on availability of said data path connections and appropriateness of data path connection for a given type and destination of data being transferred.

22. A method of interfacing a multi-path digital signal processor to an electronic system, said method comprising:

providing a multi-path digital signal processor;

providing a direct data path connection from said multi-path digital signal processor to a local area network;

providing a data path connection from said multi-path digital signal processor to a Versa-bus Modular Eurocard bus; and providing a data path connection from said multi-path digital signal processor to at least one synchronous data path.

23. The method of claim 22 further including the step of:

installing said multi-path digital signal processor in a telephony system to allow sending and receiving data by any one and all of said data path connections between said multi-path digital signal processor and said telephony system.

24. The multi-path digital signal processor of claim 1, wherein said at least one synchronous serial signal path includes means for sending and receiving pulse code modulated signals.

* * * * *